United States Patent
Guo et al.

(10) Patent No.: US 9,223,064 B2
(45) Date of Patent: Dec. 29, 2015

(54) PHOTONIC CRYSTAL-METALLIC STRUCTURES AND APPLICATIONS

(75) Inventors: Yunbo Guo, Ann Arbor, MI (US);
Theodore B. Norris, Dexter, MI (US);
James R. Baker, Ann Arbor, MA (US);
Lingjie Jay Guo, Ann Arbor, MI (US);
Nils G. Walter, Ann Arbor, MI (US)

(73) Assignee: The Regents Of The University of Michigan, Ann Arbor, MI (US)

( * ) Notice: Subject to any disclaimer, the term of this patent is extended or adjusted under 35 U.S.C. 154(b) by 404 days.

(21) Appl. No.: 13/700,378

(22) PCT Filed: May 26, 2011

(86) PCT No.: PCT/US2011/038177
§ 371 (c)(1),
(2), (4) Date: Mar. 5, 2013

(87) PCT Pub. No.: WO2011/150231
PCT Pub. Date: Dec. 1, 2011

(65) Prior Publication Data
US 2013/0168536 A1    Jul. 4, 2013

Related U.S. Application Data

(60) Provisional application No. 61/349,440, filed on May 28, 2010.

(51) Int. Cl.
*G02B 5/00* (2006.01)
*G02B 1/00* (2006.01)
*B82Y 20/00* (2011.01)

(52) U.S. Cl.
CPC ............... *G02B 5/008* (2013.01); *G02B 1/005* (2013.01); *B82Y 20/00* (2013.01); *Y10S 977/70* (2013.01)

(58) Field of Classification Search
CPC combination set(s) only.
See application file for complete search history.

(56) References Cited

U.S. PATENT DOCUMENTS

| | | | |
|---|---|---|---|
| 6,404,947 B1 * | 6/2002 | Matsuda | 385/24 |
| 2008/0225293 A1 * | 9/2008 | Ye et al. | 356/364 |

OTHER PUBLICATIONS

V. N. Konopsky et al., "Long-range propagation of plasmon polaritons in a thin metal film on a one-dimensional photonic crystal surface," Physical Review Letter, PRL 97, 253904, Dec. 22, 2006.
Pierre Berini, "Long-range surface plasmon polaritons," Advances in Optics and Photonics, vol. 1, Issue 3, pp. 484-588, 2009.
International Search Report and Written Opinion of the ISA, ISA/KR, mailed Feb. 9, 2012 in corresponding PCT/US2011/038177.
Balaa Karla, et al., "Surface Plasmon Enhanced TIRF Imaging" G.I.T. Imaging & Microscopy, p. 55-56 (2007).
Beard, Paul C., et al., "Transduction Mechanisms of the Fabry-Perot Polymer Film Sensing Concept for Wideband Ultrasound Detection", IEEE Transactions on Ultrasonics, Ferroelectrics, and Frequency Control, vol. 46, No. 6, p. 1575-1582 (1999).

(Continued)

*Primary Examiner* — Francis M Legasse, Jr.
(74) *Attorney, Agent, or Firm* — Harness, Dickey & Pierce, PLC

(57) ABSTRACT

A photonic crystal-metallic (PCM) structure receives an input light signal from a light source. The PCM structure includes a metal structure and a photonic crystal structure disposed adjacent the metal structure. The photonic crystal structure is configured to receive the input light signal such that the input light signal excites surface plasmons of the metallic structure and such that the input light signal is internally reflected within the photonic crystal structure.

23 Claims, 8 Drawing Sheets

(56) References Cited

OTHER PUBLICATIONS

Buma, T., et al., "High-frequency ultrasound array element using thermoelastic expansion in an elastomeric film", Applied Physics Letter, vol. 79, No. 4, p. 548-550 (2001).
Chou, Stephen et al., "Improved Nanofabrication through guided transient liquefaction" Nature Publishing Group, vol. 3, p. 295-300 (2008).
Coleman, Jackson, et al., "High-Resolution Ultrasonic Imaging of the Posterior Segment" American Academy of Opthalmology, 2004.
Cooper, Matthew A., "Optical Biosensors in Drug Discovery", Nature Publishing Group, vol. 1, p. 515-528 (2002).
Fan, Xudong, et al., "Sensitive optical biosensors for unlabeled targets: A review", Analytica Chimica Acta, vol. 620, p. 8-26 (2008).
Foster, F. Stuart, et al., "Advances in Ultrasound Biomicroscopy", Ultrasound in Med & Biol, vol. 26, No. 1, p. 1-27 (2000).
Foster, F.S., et al., "A New Ultrasound Instrument for Iv Vivo Microimaging of Mice", Ultrasound in Med. & Biol., vol. 28, No. 9, p. 1165-1172 (2002).
Gaspar-Armenta, Jorge A. et al., "Photonic surface-wave excitation: photonic crystal-metal interface", J. Opt. Soc. Am. B/vol. 20, No. 11, p. 2349-2354 (2003).
Guo, Yunbo, "Sensitive molecular binding assay using a photonic crystal structure in total internal reflection", Optic Express 11749, vol. 16, No. 16 (2008).
Honda, Yasuhiro, et al., "Frontiers in Intravascular Imaging Technologies", Journal of the American Heart Association, vol. 117, p. 2024-2037 (2008).
Homola, Jiri, "Present and future of surface plasmon resonance biosensors", Anal. Bioanal. Chem., vol. 377, p. 528-539 (2003).
Hou, Yang, "Optical generation of high frequency ultrasound using two-dimensional gold nanostructure", Applied Physics Letters, vol. 89, p. 093901-093901-3 (2006).
Huang, Sheng-Wen, et al., "Low-noise wideband ultrasound detection using polymer microring resonators", Applied Physics Letters, vol. 92, p. 193509-193509-3 (2008).
Hou, Yang, et al., "Broadband all-optical ultrasound transducers", vol. 91, p. 073507-073507-3 (2007).
Hou, Yang, et al., "Improvements in Optical Generation of High-Frequency Ultrasound", IEEE Transactions on Ultrasonics, Ferroelectris, and Frequency Control, vol., 54, No. 3 (2007).
Kabashin, A.V. et al., "Plasmonic nanorod mata materials for biosensing", Nature Materials., vol. 8, p. 867-871 (2009).
Kashyap, Raman, et al., "Surface Plasmon Resonance-Based Fiber and Planar Waveguide Sensors", Journal of Sensors, vol. 2009, Article ID 645162, p. 1-9 (2009).
Kolomenski, Andrei, et al., "Propagation length of surface plasmons in a metal film with roughness", Applied Optics, vol. 48, No. 30, p. 5683-5691 (2009).
Konopsky, Valery N., "Long-range plasmons in lossy metal films on photonic crystal surfaces", Optics Letters, vol. 34, No. 4, p. 479-481 (2009).
Konopsky, Valery N., "Photonic Crystal Surface Waves for Optical Biosensors", Analytical Chemistry, vol. 79, No. 12, p. 4729-4735 (2007).
Levene, M.J., et al., "Zero-Mode Waveguides for Single-Molecule Analysis at High Concentrations", www.Sciencemag.org, vol. 299, p. 682-686, (2003).
Lee, Mindy, et al., "Two-dimensional silicon photonic crystal based biosensing platform for protein detection", Optics Express, vol. 15, No. 8, p. 4530-4535 (2007).
Lockwood, G.R., et al., "Applications of High-frequency Ultrasound Imaging", IEEE Engineering in Medicine and Biology, p. 60-71 Nov./Dec. 1996.
Miyake, Takeo, et al., "Real-Time Imaging of Single-Molecule Fluorescence with a Zero-Mode Waveguide for the Analysis of Protein-Protein Interaction", Analytical Chemistry, vol. 80, No. 15, p. 6018-6022 (2008).
Noda, Susumu, et al., "Spontaneous-emission control by photonic crystals and nanocavities", Nature Publishing Group, vol. 1, p. 449-458 (2007).
Oralkan, Omer, et al., "High-Frequency CMUT Arrays for High-Resolution Medical Imaging", IEEE Ultrasonic Symposium, p. 399-402 (2004).
Piliarik, Marek, et al., "Surface plasmon resonance (SPR) sensors: approaching their limits?", Optics Express, vol. 17, No. 19, p. 16505-16517 (2009).
Ramirez-Duverger, Aldo S. et al., "Experimental determination of a surface wave at the one-dimensional photonic crystal-metal interface", J. Opt. Soc. Am. B/vol. 25, No. 6, p. 1016-1024 (2008)
Schneckenburger, Herbert, "Total internal reflection fluorescence microscopy: technical innovations and novel applications", Science Direct, vol. 16, p. 13-18 (2005).
Sentenac, Anne, et al., "Subdiffraction Light Focusing on a Grating Substrate", Physical Review Letters, PRL 101, p. 013901-013901-4 (2008).
Shinn, M, "Surface plasmon-like sensor based on surface electromagnetic waves in a photonic band-gap material", Science Direct, Sensors and Actuators B 105, p. 360-364 (2005).
Soboleva, I.V., et al., "Fluorescence emission enhanced by surface electromagnetic waves on one-dimensional photonic crystals", Applied Physics Letters, vol. 94, p. 231122-231122-3 (2009).
Sorazu, B., et al., "Optical Generation and Detection of Ultrasound", Blackwell Publishing ltd, vol. 39, p. 111-114 (2003).
Suk Huh, Yun, et al., "Surface enhanced Raman spectroscopy and its application to molecular and cellular analysis", Microfluid Nanofluid, vol. 6, p. 285-297 (2009).
T. Buma, et al., "High-frequency ultrasound array element using thermoelastic expansion in an elastromeric film", Applied Physics Letters, vol. 79, No. 4, p. 548-550 (2001).
Usievich, B.A. et al., "Surface waves at the boundary of a system of coupled waveguides", Quantum Electronics, 37 (10) p. 981-984 (2007).
Villa, F. et al., "Photonic crystal sensor based on surface waves for thin-film characterization", Optics Letters, vol. 27, No. 8 p. 646-648 (2002).
Wells, PNT, "Ultrasound Imaging", Physics in Medicine and Biology, vol. 51, p. R83-R98 (2006).
Yong Ye, Jing, et al., "Enhancing fluorescence detection with a photonic crystal structure in a total-internal-reflection configuration", Optics Letters, vol. 33, No. 15, p. 1729-1731 (2008).
Yong Ye, Jing, et al., "Enhancement of two-photon excited fluorescence using one-dimensional photonic crystals", Applied Physics Letters, vol. 75, No. 23 p. 3605-3607 (1999).

* cited by examiner

PHOTONIC CRYSTAL-METALLIC STRUCTURES AND APPLICATIONS

CROSS-REFERENCE TO RELATED APPLICATIONS

This application is a 371 U.S. National Stage of International Application No. PCT/US2011/038177, filed May 26, 2011, which claims the benefit of U.S. Provisional Application No. 61/349,440, filed on May 28, 2010, the entire disclosures of which are incorporated herein by reference.

FIELD

The present disclosure relates to photonic crystal structures and, more specifically, relates to photonic crystal-metallic structures and various applications of the same.

BACKGROUND

Photonic crystals (PCs) are attractive optical materials for controlling and manipulating the flow of light. Specifically, PCs are composed of periodic dielectric or metallic-dielectric nanostructures and affect the propagation of electromagnetic waves by defining allowed and forbidden photonic bands. When a structural defect is introduced in the PCs, a photon-localized state can be created in the photonic band gap and the electrical field around the defect can be confined and enhanced. Control of defect modes by PC structures is becoming a key technology for many new photonic devices, like photonic crystal fibers, photonic chips, low-threshold lasers, and optical biosensors.

Also, surface plasmons (SPs) have attracted tremendous interest over the last two decades, both from a fundamental-physics perspective and as highly sensitive devices for optical detection of small biological or chemical entities. SPs are waves that propagate along the surface of a conductor, usually a metal film, and they are essentially p polarized light waves that are trapped on the surface because of their interaction with the free electrons of the metal. This part of light is further transferred into heat within the metal film and gets lost. This property is the basic mechanism of surface plasmon resonance (SPR) based biosensor. The surface plasmon modes can be excited in the configuration by phase matching. The field intensity is enhanced in the metal, but decays both in the dielectric layer (substrate) and the surrounding medium. The excited surface plasmon mode can be characterized by a (very broad) resonance dip in the reflectance spectrum since this part of light is resonant and absorbed in the very lossy metal film.

Besides bulk prism configuration in SPR sensors, optical waveguides, fibers, and gratings have also been developed to excite surface plasmon modes, and they offer advantages of miniaturization, a high degree of integration and remote sensing applications. However, phase matching in these structures can be difficult.

SUMMARY

A photonic crystal-metallic (PCM) structure that receives an input light signal from a light source is disclosed. The PCM structure includes a metal structure and a photonic crystal structure disposed adjacent the metal structure. The photonic crystal structure is configured to receive the input light signal such that the input light signal excites surface plasmons of the metallic structure and such that the input light signal is internally reflected within the photonic crystal structure.

A method of operating a photonic crystal-metallic structure is also disclosed. The method includes providing a metal structure adjacent a photonic crystal structure and emitting an input light signal from a light source to the photonic crystal structure such that the input light signal excites surface plasmons of the metallic structure and such that the input light signal is internally reflected within the photonic crystal structure.

Moreover, a photonic crystal-metallic (PCM) structure that receives an input light signal from a light source is disclosed. The PCM structure includes a metal structure, a defect member, and a photonic crystal structure disposed adjacent the metal structure such that the defect member is disposed between the metal structure and the photonic crystal structure. The photonic crystal structure is configured to receive the input light signal such that the input light signal excites surface plasmons of the metallic structure and such that the input light signal is internally reflected within the photonic crystal structure to thereby operate as one of an ultrasonic generator, an ultrasonic sensor, an ultrasonic transducer, a biosensor, and a fluorescence detector.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
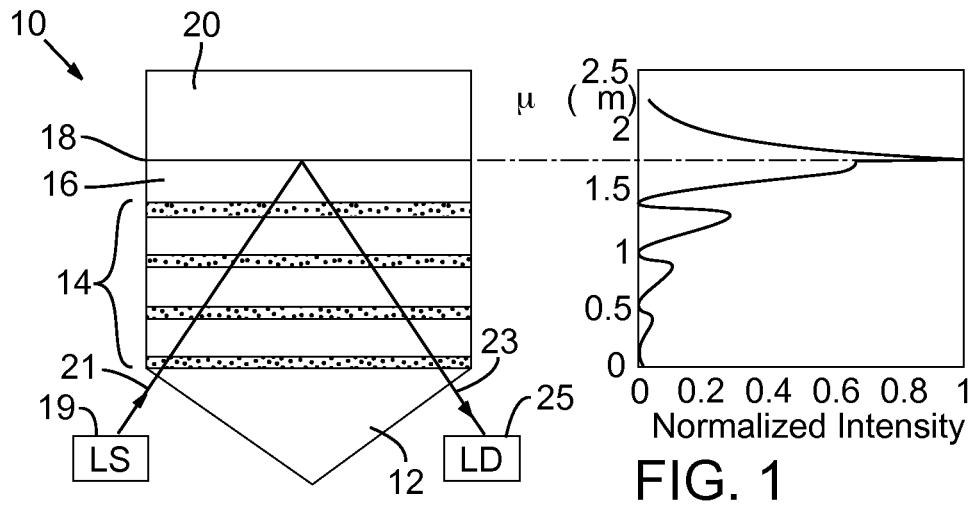
FIG. 1 is a schematic sectional view of a photonic crystal-metallic (PCM) structure and a corresponding graphical representation of the intensity distribution of the PCM structure according to various exemplary embodiments of the present disclosure.

Referring initially to FIG. 1, a photonic crystal-metallic (PCM) structure 10 is schematically illustrated. Generally, the PCM structure 10 includes a photonic crystal (PC) structure 14 and a metallic structure 18 disposed adjacent the PC structure 14. A defect layer 16 (i.e., defect member) can be disposed between the PC structure 14 and the metallic structure 18. More specifically, the defect layer 16 can be a continuous layer that is disposed directly on the PC structure 14. The metallic structure 18 can also be a continuous layer of metal layered directly on the defect layer 16. Also, a prism 12 and a surrounding medium 20 (e.g., water or other suitable substance) can be on opposite sides of the PCM structure 10.

The prism 12 can include BK 7 glass in some embodiments. However, the prism 12 can be of any suitable type.

Also, the PC structure 14 can include various layers or materials, such as $TiO_2/(SiO_2/TiO_2)^3$. The defect layer 16 can be of any suitable type and material, such as $SiO_2$. Furthermore, the PC structure 14, the defect layer 16, and/or other components of the PCM structure 10 can include various features disclosed in U.S. Pat. No. 7,693,362, issued Dec. 29, 2009 to Ye et al. and/or U.S. patent application Ser. No. 12/616,457, filed Nov. 11, 2009, both of which are incorporated by reference in their entireties.

The metallic structure 18 can be of any suitable type and can include metal film (e.g., gold or silver). In some embodiments, the metallic structure 18 can be a one dimensional (1-D) layer. In other embodiments, the metallic structure 18 can include a metal nanostructure, metamaterials, etc.

The prism 12, PC structure 14, defect layer 16, and metallic structure 18 can have any suitable thickness. Also, the prism 12, PC structure 14, defect layer 16, and metallic structure 18 can be made out of any suitable material. Furthermore, the prism 12, PC structure 14, defect layer 16, and metallic structure 18 can have any suitable shape.

In some embodiments, the PC structure 14 can have a total internal reflection (TIR) geometry. Specifically, the structure 10 can include a 1-D PC structure 14 (with a defect layer 16) and an adjacent metallic structure 18 on top of the defect layer 16, and the structure 10 can have a total-internal-reflection (TIR) geometry. A TIR boundary can be defined at the interface between the defect layer 16 and the metallic structure 18.

A light source 19 (e.g., a laser) can provide an input light signal 21 through the prism 12 to the PC structure 14. The input light signal 21 can be totally internally reflected between the defect layer 16 and the metallic structure 18. A Fabry-Perot microcavity can form in the defect layer 16 due to the high reflectivity provided by both the PC structure 14 and the TIR boundary, and an output light signal 23 can be emitted from the structure 10. A light detector 25 can also be provided for detecting characteristics (e.g., wavelength, intensity, etc.) of the output light signal 23. Moreover, the input light signal 21 can be sufficient to excite surface plasmons of the metallic structure 18 (i.e., some of the resonance mode of the input light signal 21 can excite the plasmon mode in the metallic structure 18). Either s-polarized or p-polarized light is possible for this excitation.

By exciting surface plasmons of the metallic structure 18 and/or by detecting characteristics of the output light signal 23, the PCM structure 10 can be used in a variety of ways, some of which will be discussed in greater detail below. The following discussion relates to only some of the applications and uses of the PCM structure 10. It will be appreciated that the PCM structure 10 can also be implemented in other ways without departing from the scope of the present disclosure. Moreover, the PCM structure 10 can be configured and/or used according to (Yunbo Guo, Hyoung Won Baac, Sung-Liang Chen, Theodore B. Norris and L. Jay Guo, "Broadband high-efficiency optoacoustic generation using a novel photonic crystal-metallic structure", Proc. SPIE 7899, 78992C (2011); doi:10.1117/12.876012), which is hereby incorporated by reference in its entirety.

Surface Plasmon Excitation

Before discussing particular uses and devices that can implement the PCM structure 10, more specific information will be given regarding surface plasmon (SP) excitation. SPs are waves that propagate along the surface of a conductor, usually a metal film, and they are essentially p-polarized light waves that are trapped on the surface because of their interaction with the free electrons of the metal. This part of light is further transferred into heat within the metal film and gets loss. This property can be utilized in a surface plasmon resonance (SPR) based biosensor. Normally the SPR sensor is made of a thin metal (gold or silver) film (~50 nm) on a glass substrate. The surface plasmon modes can be excited in the configuration by phase matching. The field intensity is enhanced in the metal, but decays both in the dielectric layer (substrate) and the surrounding medium. The excited surface plasmon mode can be characterized by a (very broad) resonance dip in the reflectance spectrum since this part of light is resonant and absorbed in the very lossy metal film.

Besides bulk prism configuration in SPR sensors, optical waveguides, fibers, and gratings have also been developed to excite surface plasmon modes, and they offer advantages of miniaturization, high degree of integration and remote sensing applications. However, phase matching in these structures may be not easy to achieve.

Mechanism of Using PC-Metallic Structure

Operation of the PCM structure 10 is now explained in greater detail. Total internal reflection (TIR) occurs between the defect layer 16 and the metallic structure 18, and a Fabry-Perot microcavity forms in the defect layer 16 due to the high reflectivity provided by both the PC structure 14 and the TIR boundary, wherein some of the resonance mode can be used to excite the plasmon mode in the metallic structure 18. The excited plasmon mode satisfies the conditions for both the existence of resonance mode in the Fabry-Perot cavity and the plasmon mode in the metallic structure 18; therefore, its width can be much narrower than that of a SPR-based sensor. With the metallic structure 18 adjacent to the PC structure 14 and defect layer 16, the field intensity is first enhanced by PC structure 14 and gets a large enhancement in the defect layer 16, then is further enhanced in the metallic structure 18, and finally decays in the evanescent region as shown graphically in FIG. 1. (The broken line between the schematic diagram and the graph shows the TIR boundary.)

The enhanced field intensity is attractive to intensity-related measurements, like fluorescence or Surface-Enhanced-Raman-Scattering measurements, etc. Moreover, by choosing a suitable PC structure 14 and a suitable thickness for the metal structure 18, light from the light source 19 can be delivered at predetermined wavelengths to be totally absorbed by the PC-Metallic structure 10. Thus, the absorbed light input signal 21 can be transferred into heat, which can be used to generate an ultrasound signal in sensitive polymer materials like polydimethylsiloxane (PDMS) via the thermoelastic effect. Also, a fundamental resonance dip appears in the reflectance spectrum corresponding to the excited mode (the absorbed part), which can be used for ultrasound detection like an etalon sensor or a biosensor.

In addition, because the PCM structure 10 is put in a total-internal-reflection geometry, the resonance wavelength of our structure can be easily adjusted by the incident angle. Also, fewer layers in the PC structure 14 need be included. Moreover, an open surface that can be easily accessed by analytes or targets can be defined above the metallic structure 18. Furthermore, TIR configuration can reduce unwanted transmitted light or noise.

The PCM structure 10 introduces a novel plasmon excitation mechanism, and makes light from specific wavelength be largely absorbed, reflected, and enhanced. This forms the basic mechanism for constructing a variety of different devices or systems for various devices, including an ultrasound transmitter or/and receiver, a biomolecular sensor, an enhanced fluorescence and Raman scattering detector, and more.

Exemplary Devices and Uses for PCM Structure

Figure 2:
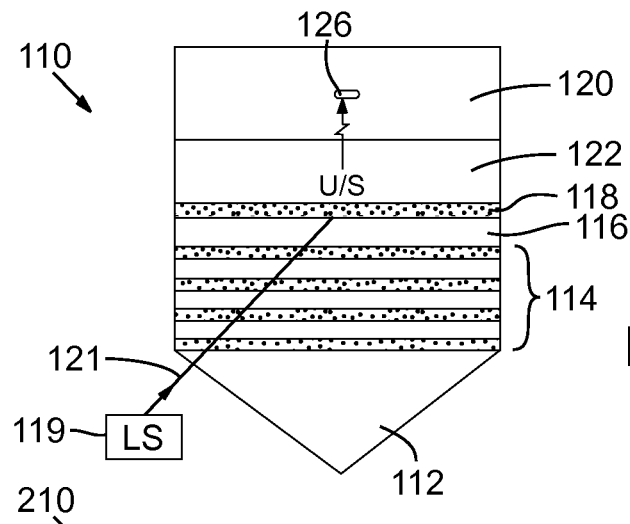
FIG. 2 is a schematic sectional view of the PCM structure of FIG. 1 for an ultrasonic transmitter according to additional embodiments of the present disclosure.

Referring to FIG. 2, the PCM structure 110 is illustrated according to various additional embodiments. For instance, the PCM structure 110 can be implemented in a broadband all-optical ultrasound transmitter (generator). Components that are similar to the embodiments of FIG. 1 are indicated with corresponding reference numerals increased by 100.

As shown in FIG. 2, the structure 110 can be substantially similar to that of FIG. 1; however the structure 110 can also include a polymer structure 122 (i.e., an outer member) disposed adjacent the metallic structure 118 (e.g., between the metallic structure 118 and the surrounding medium 120). In some embodiments, the polymer structure 122 can include polydimethylsiloxane (PDMS) or polymethyl-methacrylate (PMMA); however, the polymer structure 122 (i.e., outer member) can be made of any suitable material. The polymer structure 122 can have relatively high thermal expansion characteristics (e.g., a thermal expansion coefficient of at least $3.1 \times 10^{-4}$/K) such that the polymer structure 122 expands a substantial amount due to increasing temperature. The polymer structure 122 can also have a relatively high optical absorption. For instance, the polymer structure 122 can include carbon black or metal nanoparticles incorporated therein. The polymer structure 122 can also have relatively low heat capacity and near-water acoustic impedance. Also, an ultrasound receiver 126 can be included in the surrounding medium 120.

During operation, the light source 119, such as a pulsed laser can emit the input light signal 121 through the PCM structure 110. This generates heat that is received by the polymer structure 122, and the polymer structure 122 can thermally expand as a result. Because of the thermoelastic effect (discussed below), the thermal expansion of the polymer structure 122 can cause an ultrasound signal (designated as "U/S" in FIG. 2) to be generated through the polymer structure 122 and toward the receiver 126. It will be appreciated that the ultrasonic signal generated can be at a significant acoustic pressure.

One characteristic of the thermoelastic effect is that the acoustic pressure in the far field is proportional to the time derivative of a laser pulse, meaning that the center frequency and bandwidth of the generated ultrasound is mainly determined by the incident laser pulse; thus, acoustic waves with desired properties can be achieved simply by modulating the optical input from the light source 119. In addition, the far field acoustic pressure generated by an incident laser pulse can be theoretically described as:

$$P_{far} = \frac{1}{4\pi} \frac{3B^2 \alpha_L}{\rho^2 c^2 C} \frac{1}{r} \frac{dI\left(t - \frac{r}{c}\right)}{dt} \propto \frac{dI(t)}{dt}$$

where B is the bulk modulus, $\rho$ is the density, $\alpha L$ is the linear coefficient of thermal expansion, c is the longitudinal wave speed in the medium, C is the specific heat capacity, I is the total optical energy incident onto the film, and r is the distance from the surface.

Thus, the ultrasonic signal can be generated by relying on the thermoelastic effect. A relatively strong ultrasound signal can be generated, and the generated acoustic pressure (amplitude) at the far field can be linearly proportional to the power of laser pulsed energy from the light source 119. That means that a higher acoustic pressure can be generated by increasing the pulsed laser power from the light source 119. In some embodiments, the acoustic pressure can be approximately ten times the acoustic pressure of related prior art devices.

Also, because the PCM structure 110 is in a total-internal-reflection (TIR) geometry, with most of the incident light absorbed by the metallic structure 118, the input light signal 121 can be reflected back such that there will be substantially no light injected to the receiver 126. Accordingly, the light (even a large laser pulse power) is unlikely to damage the receiver 126.

Figure 3:
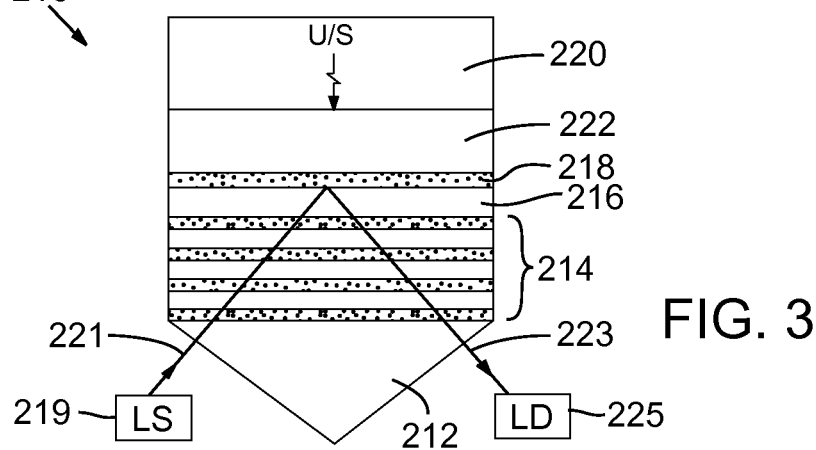
FIG. 3 is a schematic sectional view of the PCM structure of FIG. 1 for an ultrasonic receiver according to additional embodiments of the present disclosure.

Referring now to FIG. 3, the PCM structure 210 is illustrated according to various additional embodiments. For instance, the PCM structure 210 can be implemented in an ultrasound sensor/detector/receiver having high sensitivity. Components that are similar to the embodiments of FIG. 1 are indicated with corresponding reference numerals increased by 200.

As shown, the PCM structure 210 can be substantially similar to the embodiments described above. During operation, an ultrasound signal can be transmitted to the polymer structure 222 (i.e., outer member), and the ultrasound signal can cause the polymer structure 222 to vibrate, elastically flex, and deflect from a neutral position. The input light signal 221 can be transmitted from the light source 219 through the PCM structure 210, and the output light signal 223 can be measured by the light detector 225 in order to detect the deflection of the polymer structure 222. Specifically, the light detector 225 can detect the change in the properties (e.g., thickness or refractive index) of the deflecting polymer structure 222 due to the influence of the ultrasound signal. Accordingly, the PCM structure 210 can be used to detect the ultrasound signal that is input. It will be appreciated that the PCM structure 210 can have a high sensitivity for detecting the ultrasound signal. The PCM structure 210 can also have a relatively broad bandwidth.

Figure 11:
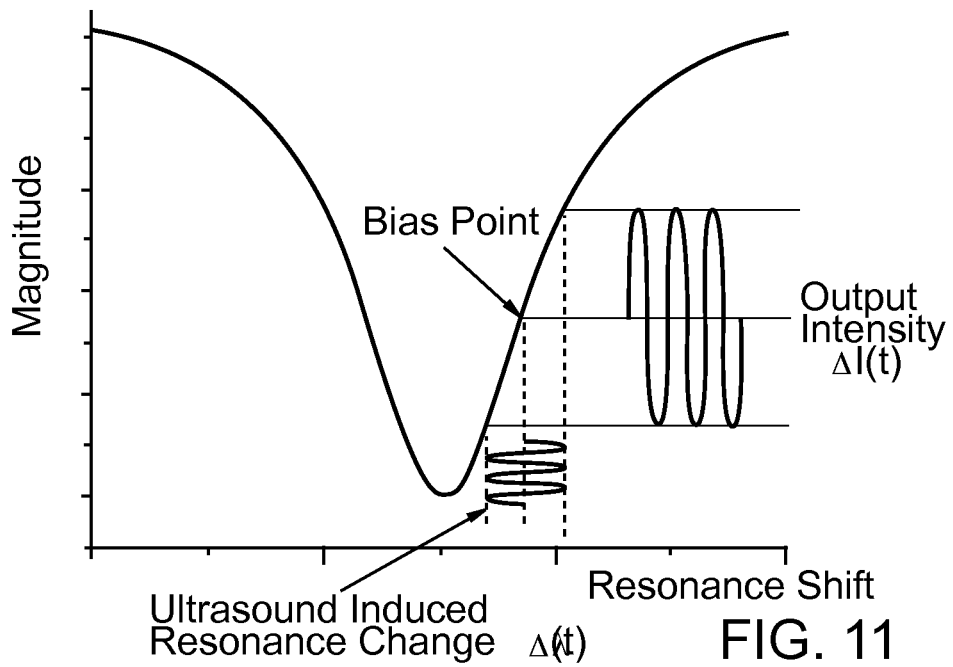
FIG. 11 is a graph representing the PCM structure of FIG. 3.

Operation of the structure 210 will be discussed in greater detail. When the ultrasound signal reaches the structure 210, the ultrasonic pressure wave changes the optical thickness of the structure 210, especially the top polymer member 222. This results in a change of resonance wavelength, thus altering the intensity of the reflected input light signal 221 (i.e., the laser wavelength tunes to the steep portion of the resonance dip, as illustrated in FIG. 11).

The detection sensitivity of the structure 210 can depend on two variables: 1) the conversion efficiency of resonance wavelength shift to optical intensity change (optical sensitivity $O_s$); and 2) the conversion efficiency of acoustic pressure to resonance wavelength shift (acoustic sensitivity $A_s$).

The optical sensitivity $O_s$ is defined as the optical power modulation per unit wavelength shift (μW/nm) at the bias of $\lambda_0$ the PCM structure 210, and the maximum optical sensitivity is given by:

$$O_s|_{max} = \left[\frac{dI_r}{d\lambda}\right]_{\lambda_0}\bigg|_{max} = \pm 1.3 I_0 \cdot \frac{1-R_{min}}{\Delta\lambda}$$

where $I_0$ is the incident laser intensity, and $R_{min}$, and $\Delta\lambda$ are the minimum reflectance and the FWHM of the resonance dip, respectively. Therefore, $O_s$ is dependent upon the incident laser power and the finesse of the cavity of the PCM structure 210.

On the other hand, the acoustic sensitivity $A_s$ represents the magnitude of the resonance wavelength shift produced per unit acoustic pressure (nm/MPa), which is the product of the resonance shift sensitivity to the optical thickness change $B_S$ (nm/nm) and the acoustic pressure sensitivity to the polymer optical thickness change $P_S$ (nm/MPa). The first one $B_S$ is related to the whole structure and can be calculated by transfer matrix simulation, and the latter $P_S$ can be expressed as:

$$P_s = \frac{\delta d}{\delta P} = \frac{\delta\varepsilon}{\delta P} \cdot d = -\frac{d}{E}$$

where $\in$ is the strain due to acoustic pressure on the polymer layer, E is the Young's Modulus of the polymer structure 222, and d is the thickness of the polymer layer.

Therefore, the maximum overall sensitivity S (μW/MPa) of the PC-Metallic sensor is given by the product of $I_s$ and $A_s$:

$$S_{max} = \frac{dI_r}{dP} = \frac{dI_r}{d\lambda}\frac{\partial\lambda}{\partial P} = O_s \cdot A_s = \mp 1.3 I_0 \cdot \frac{1-R_{min}}{\Delta\lambda} \cdot \frac{d}{E} \cdot B_S$$

In order to get high sensitivity of the PCM structure 210 ultrasound receiver, there should be high incident laser intensity, narrow and deep resonance dip (small $R_{min}$ and $\Delta\lambda$), large polymer thickness and resonance shift sensitivity, and polymer material with low Young's modulus.

For example, in some embodiments, $R_{min}\sim 0$, $\Delta\lambda=20$ nm, d=2.03 μm, $B_S$=0.13 nm/nm, and E=5 MPa for PDMS. As such, the ultrasound detection sensitivity $S_{max}$ can be $3.4\times 10^3$ μW/MPa when the incident laser intensity $I_0$=1 mW.

Moreover, the PCM structure 210 can exhibit good frequency response. Since the elastic displacement due to the acoustic pressure is mainly from the thickness change of the polymer structure 222, the frequency response is dependent upon the acoustic properties of the polymer structure 222, the backing material and the surrounding media 220. The frequency-dependent modifying term $P_I(k)$ can be obtained by considering the mean distribution of stress $P_T$ across the thickness d of the polymer structure 222 due to an incident acoustic wave:

$$P_I(k) = \frac{1}{d}\int_d P_T dy$$

where $k=2\pi f/v$ is the acoustic wave number, f is the acoustic frequency, and v is the ultrasound wave traveling speed in the polymer structure 222. Further, the frequency-dependent term can be derived as:

$$|P_I(k)| = \frac{T\sqrt{2}}{kd}\sqrt{\frac{(R_1^2 + 2R_1\cos(kd) + 1)(1-\cos(kd))}{(R_1R_2)^2 - 2R_1R_2\cos(2kd) + 1}}$$

where T is the pressure-amplitude transmission coefficient resulting from the acoustic-impedance mismatch between the spacer layer and surrounding media, $R_1$ and $R_2$ are the pressure-amplitude reflection coefficients at the two surfaces of the film, and $$T = \frac{2Z}{Z+Z_2}, R_1 = \frac{Z_1-Z}{Z_1+Z}, R_2 = \frac{Z_2-Z}{Z_2+Z}$$

where Z is the acoustic impedance of the polymer sensing film, $Z_1$ and $Z_2$ are the acoustic impedances of the backing media and surrounding media.

Therefore we can get the response spectrum for each frequency, which is mainly related to the polymer structure's 222 impedance and thickness.

Figure 12:
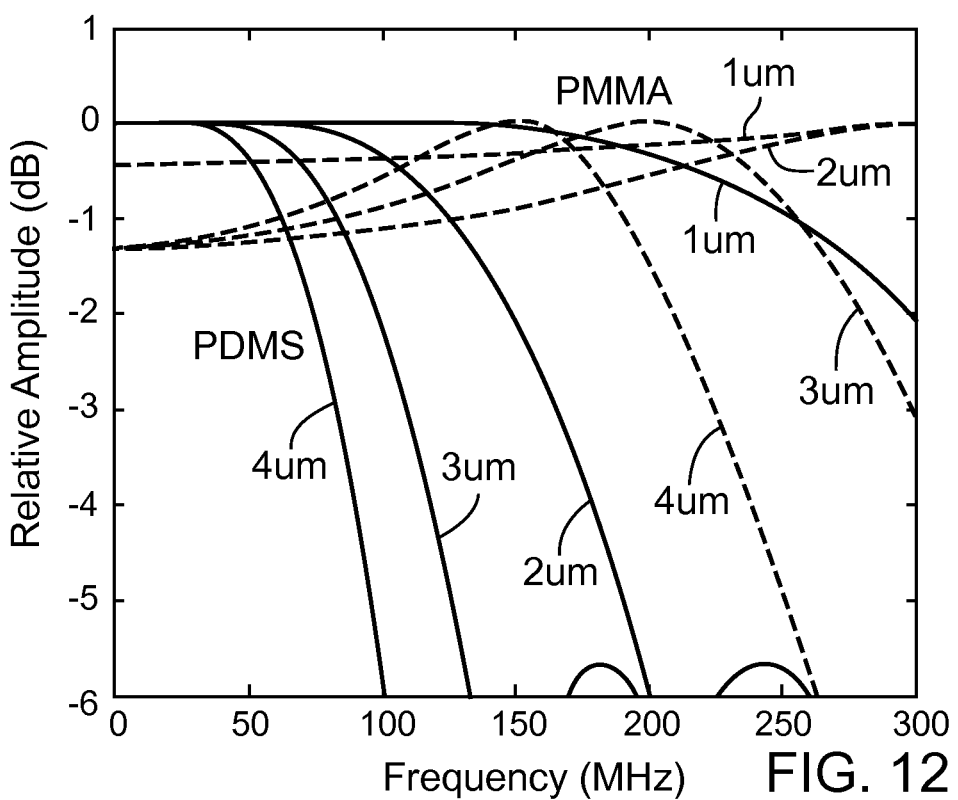
FIG. 12 is a graph representing frequency response of PCM structures of the type shown in FIG. 4.

FIG. 12 illustrates the response spectrum of various exemplary PCM structures 210 of the type illustrated in FIG. 3. Specifically, the PCM structures 210 include those with two polymer structures 222 made from PDMS and PMMA with different thickness (1~4 μm), then $Z=1.9\times 10^6$ Kg/m²s for PDMS or $3.23\times 10^6$ Kg/m²s for PMMA; $Z_1=63.8\times 10^6$ Kg/m²s for gold; $Z_2=1.483\times 10^6$ Kg/m²s for water, and the acoustic velocities are 1000 m/s, 2740 m/s, 3240 m/s and 1480 m/s for PDMS, PMMA, gold and water, respectively. Thus, FIG. 12 shows that larger acoustic impedance material (that is larger Young's Modulus) detects larger frequency response, and so does thinner thickness in the polymer structure 222. There is a trade-off between the sensitivity and the frequency response of the ultrasound detector using PC-Metallic structure 210 in TIR with the polymer structure 222. It will be appreciated that the materials, thickness, and other characteristics of the polymer structure 222 could be chosen such that the PCM structure 210 exhibits specific requirements. For example, we can use 2 μm PDMS for the polymer structure 222 to detect 200 MHz high frequency ultrasound signal within −6 dB range, with a large sensitivity $3.4\times 10^3$ μW/MPa.

It will also be appreciated that the effective element size is a measure of the acoustic aperture of a receiver. Its effect on lateral spatial resolution makes it a key parameter in an ultrasonic measurement and imaging system. Normally the spot size of the focused probe laser determines the effective element size and then the spatial resolution, which can be smaller to several micrometers. However, the focused probe resolving a small spot on the detector requires a large range of spatial frequencies, corresponding to the angular spread of the illuminating beam, which will broaden the resonance mode width. It will also be appreciated that the overall detection sensitivity of our sensor will decrease (like an etalon detector). There is always a tradeoff between detection sensitivity and element size.

The total angular spread of a focused laser beam (Gaussian beam) is then given by the divergence angle:

$$\Theta \approx \frac{2\lambda}{\pi w_0}$$

where $\lambda$ is the incident laser wavelength and $w_0$ is the waist of the Gaussian beam (can be considered as the spot size of the focused laser beam).

Figure 13A:
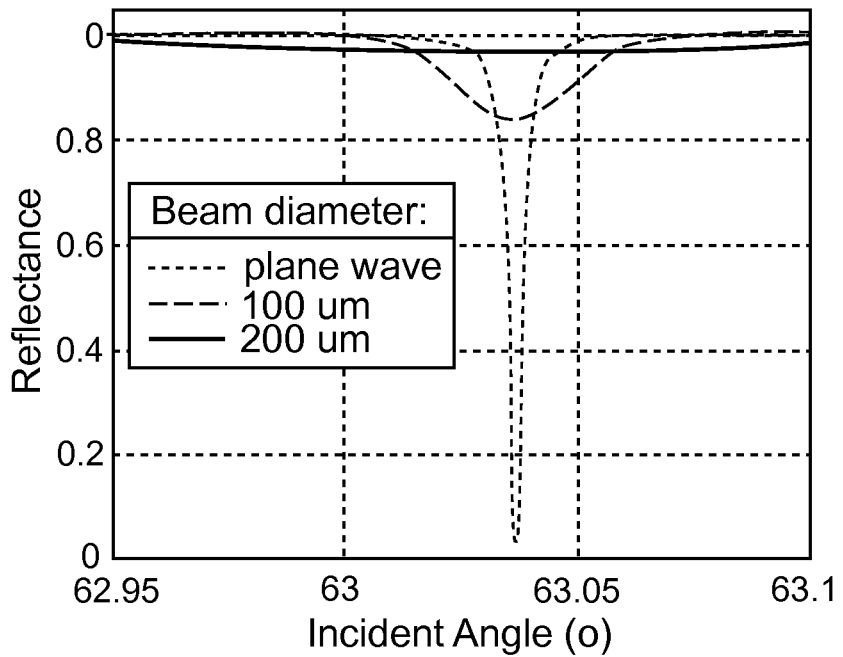
FIG. 13A is a graph representing the effect of focus beam on narrower resonance width for a PC-TIR sensor.
Figure 13B:
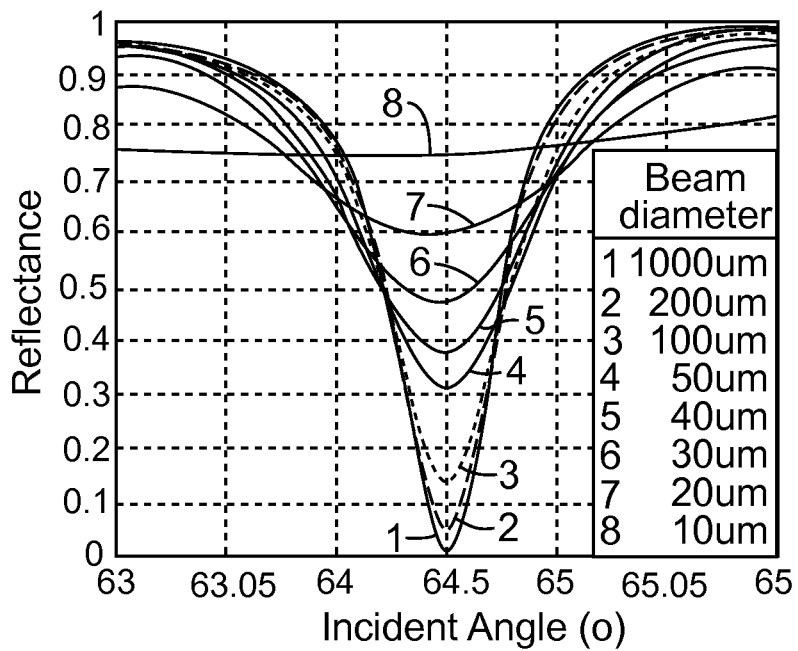
FIG. 13B is a graph representing the effect of a focused beam size on larger resonance width for a PCM sensor.

A comparison can be made between the effect of the focused beam on the resonance dip for PC-TIR sensor which runs with s polarization and has a very narrow resonance (FWHM ~0.003°) mode (FIG. 13A), and for PC-Metallic structure 210 which runs with p polarization and has a relatively broad resonance mode (FWHM ~0.5°) (FIG. 13B). As shown, the PC-Metallic structure 210 is more flexible to use small spot size for high spatial resolution detection, with reasonably decreasing the detection sensitivity. Moreover, the PC-Metallic structure 210 can be used for an all-optical ultrasound transducer, and the whole sensitivity can be improved by generating strong acoustic pressure with a high power laser pulse.

Accordingly, the PCM structure 210 can be used as a sensitive, broad-band ultrasound receiver. This structure 210 can provide many advantages over conventional ultrasound receivers (e.g., etalon receivers).

Figure 4:
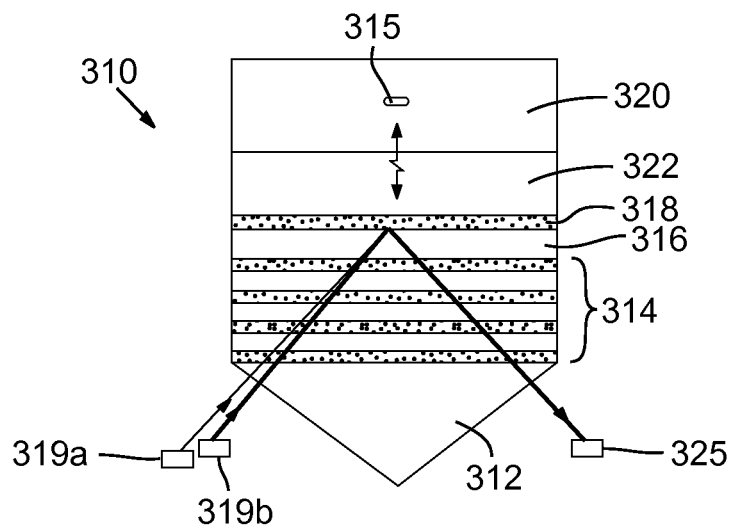
FIG. 4 is a schematic sectional view of the PCM structure of FIG. 1 for an ultrasonic transducer according to additional embodiments of the present disclosure.

Referring now to FIG. 4, the PCM structure 310 is illustrated according to various additional embodiments. For instance, the PCM structure 310 can be implemented in a broad-band, all optical ultrasound transducer (i.e., transceiver). Thus, an ultrasound transmitter and receiver can be integrated on the same structure 310. Components that are similar to the embodiments of FIG. 1 are indicated with corresponding reference numerals increased by 300.

In the embodiments shown, an object 315 (e.g., a target) can be included in the surrounding media 320. During operation, light can be input from a first light source 319a to the PCM structure 310, which can cause an ultrasound signal to be transmitted from the polymer structure 322 toward the object 315 as discussed above. The ultrasound can be reflected from the object 315, and a second light source 319b can be used to detect the property change (e.g., thickness change) in the polymer structure 322 due to the reflected ultrasound.

In some embodiments, the metallic structure 318 can be gold, and the polymeric structure 322 can be included on the metallic structure 318, on a side opposite the PC structure 314. The first light source 319a pulses a laser to generate the ultrasound signal, which is transmitted onto one or more objects 315 in the surrounding medium 320 (e.g., water). The ultrasound wave is reflected by the object(s) 315 and back to the polymer structure 322. This causes strain in the polymer structure 322, and this strain is detected using the second light source 319b (e.g., a cw laser operating at the large slope region of a resonance dip of the structure). By monitoring the reflected cw laser intensity change with the light sensor 325, the reflected ultrasound signal can be detected, and characteristics of the object(s) 315 can be detected.

There can be two ways to run the transducer structure 310 of FIG. 4. In some embodiments, the PC-Metallic structure 310 can have a resonance dip at the wavelength of the first light source 319a (the pulsed laser) for ultrasound generation, then the incident angle can be tuned to make the resonance dip close to the second light source 319b (the cw laser) for ultrasound detection. Also, in some embodiments, the wavelengths of the first and second light sources 319a, 319b can be far away from each other, the thickness of the polymer structure 322 can be designed for multiple resonance dips to occur, one resonance dip can be used for the first light source 319a (e.g., 532 nm), and another resonance dip can be used for the second light source 319b (e.g., 632.8 nm). The properties of photonic crystal structure 314 and total internal reflection geometry make the whole structure 310 easy to operate at the same area for both wavelengths by just changing the incident angle.

The parameters of the structure 310 can be designed for desirable performance (both ultrasound generation and detection). As discussed above, for ultrasound generation, an effective light absorber and a large thermal expansion coefficient polymer material can be desirable for the polymer structure 322. The PC structure 314 can also be configured for suitable performance. The thickness of the defect layer 316 and the polymer structure 322 can be designed to get a relatively large absorption at the wavelength of the first light source 319a (pulse laser). Moreover, the thickness of the polymer structure 322 can be made thin (1~4 µm) so that it won't attenuate the generated optoacoustic signal. For ultrasound detection, the polymer structure 322 can have a low Young's modulus to get large strain; high acoustic impedance and thin polymer structure 322 for high frequency response; large product of polymer thickness and shifting sensitivity; suitable focus beam for smaller element size. There may be a trade-off for all these parameters, but these variables can be chosen for specific requirements of the structure 310.

There can be several ways to get a narrow and deep resonance dip for highly sensitive ultrasound detection. For example, the structure 310 can include a substrate, and the PC structure 314 can include varying layers of $TiO_2$ and $(SiO_2/TiO_2)^N$. The defect layer 316 can be $SiO_2$, the metallic structure 318 can be gold, and the polymer structure 322 can be PDMS. The resonance dip can become narrower as the thickness of the polymer structure 322 is increased. Moreover, by increasing the number of multiple dielectric layers N in the PC structure 314 and by decreasing the thickness of the metallic structure gold layer, a much narrower resonance dip can be achieved.

In addition, one of the biggest advantages of the all-optical ultrasound transducer of the structure 310 is that it operates in total-internal-reflection geometry. On one side, a high power pulse laser can be used as the first light source 319a to generate strong acoustic waves, without damaging the object(s) 315. On the other side, open cavity configuration allows for use of a low Young's modulus polymer structure 322 to get high sensitivity, without decreasing the cavity finesse like etalon sensors.

What's more, the unique PC-Metallic structure 310 allows for operation of the ultrasound transducer at any wavelength, giving much more flexibility to choose pulse laser and cw laser sources, which is very helpful for applications and commercialization. Furthermore, the PC-Metallic structure 310 can be fabricated easily with low cost.

In all, the ultrasound transmitter and receiver provided by using the PC-Metallic structure 310, exhibits better performance than the state-of-the-art optoacoustic transmitter and receiver, respectively. Thus integrated, the all-optical ultrasound transducer based on the structure 310 possesses several advantages and has great potential to provide a broad-band (>200 MHz), high-sensitive acoustic system for biomedical and industrial applications.

The structure of the ultrasound generators, sensors, and/or transducers discussed above could be varied in many ways, some of which are illustrated in FIGS. 5-7D. Each of these structures will now be discussed in greater detail.

Figure 5:
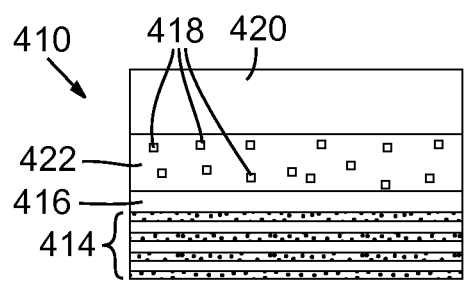
FIG. 5 is a schematic sectional view of the PCM structure of FIG. 1 according to various additional embodiments of the present disclosure.

In FIG. 5, the PCM structure 410 is illustrated according to various additional embodiments, wherein components that are similar to the embodiments of FIG. 1 are indicated with corresponding reference numerals increased by 400. As shown, the metallic structure 418 can include metallic (e.g., gold, silver, etc.) nanoparticles that are embedded and dispersed throughout the polymer structure 422.

Figure 6:
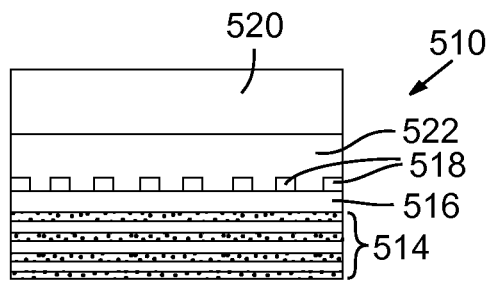
FIG. 6 is a schematic sectional view of the PCM structure of FIG. 1 according to various additional embodiments of the present disclosure.

Also, FIG. 6 shows the PCM structure 510, wherein components that are similar to the embodiments of FIG. 1 are indicated with corresponding reference numerals increased by 500. As shown, the metallic structure 518 can extend in a straight, transverse direction along the defect layer 516, and the metallic structure 518 can also include a plurality of metallic (e.g., gold, silver, etc.) nanostructures that are separated at a distance from each other along the transverse direction.

Gold, for instance, has large thermal conductivity. Therefore, heat from the gold metallic structure 418, 518 can transfer quickly to the polymer structure 422, 522. If the gold is included as a continuous layer (e.g., as in FIGS. 2-4), the interaction area for the gold and the polymer structure 422 is limited, which can restrict heat transfer efficiency and further affect the generated acoustic efficiency. Thus, using gold nanoparticles or nanostructure distributed within the polymer structure 422, 522 can greatly increase the interaction area between the gold and the polymer structure 422, 522 and then further improve the ultrasound generation amplitude and efficiency. In addition, since the gold becomes particles when the thickness goes below 10 nm, it limits to use large number PC layers and thin gold layer to get a narrow resonance mode. However, using gold nanoparticles or nanostructures gives more flexibility to choose suitable PC layers to get the narrow resonance dip.

Figure 14:
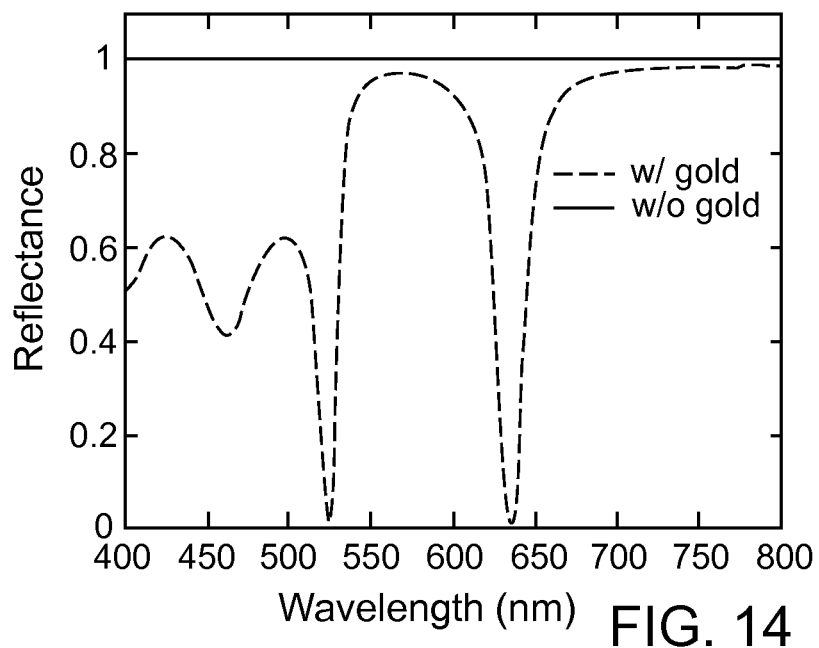
FIG. 14 is a graph representing the effect that gold nanostructures on a defect layer have on generating resonance dips.

What's more, using gold nanostructure on the defect layer 416, 516 may help to get small element size for ultrasound generation and/or detection. As FIG. 14 shows, when the light incidents on the area with gold and polymer on the top, there will appear resonance dips and then optoacoustic waves can be generated and detected, while on the area only with polymer on the top, there will be no resonance dips so that no ultrasound will be generated and detected. Thus the effective element size will be decided by the size of gold nanostructure, which can be designed to be smaller than 50 nm by current nanofabrication technology. In addition, by controlling the space between the gold nanostructure and the incident beam sizes of the pulsed laser and cw laser, the number of ultrasound transducers formed by the structure 410, 510 can be controlled, and an array of ultrasound transducers can be formed by arranging the gold nanostructures of the embodiments of FIG. 6.

In addition, the PCM structure(s) discussed above can also be incorporated on prism, waveguide, and/or fiber structure. It is convenient and easy to use bulk prism to configure a total-internal-reflection geometry and to excite plasmon modes for applications. However, the PC-Metallic structure and systems discussed above can be equally well implemented in optical waveguide or fiber geometries (D-shaped fiber, cladding-off fiber, end-reflection mirror, angled fiber tip, tapped fiber, photonic crystal fiber, etc.). Thus, the PCM structure and system can possess the advantages of miniaturization, compaction, high degree of integration and remote sensing capabilities. The whole structure (PC dielectric layers, gold layer and polymer layer) can be deposited on waveguide or fibers and provide the same functions as the system does using the prism. Multimode fibers/waveguides may be used to support both the pulsed laser and the cw laser to propagate within them, and to generate and detect optoacoustic waves at the area with PC-Metallic structure. Moreover, the small sizes of optical waveguides and fibers also provide possibility to make small element size of ultrasound transducer. Furthermore, it is easier to form an array for ultrasound imaging applications with fiber lasers and detector arrays.

Figure 7A:
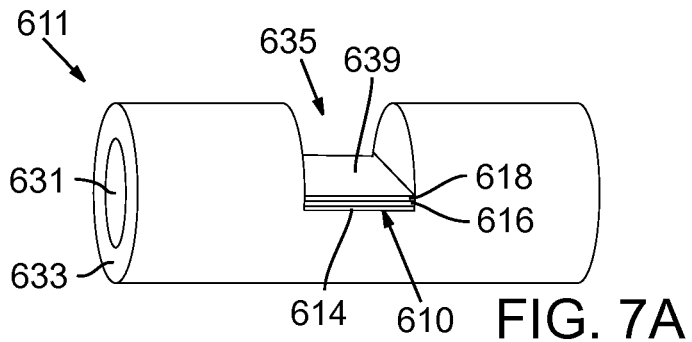
FIGS. 7A-7D are schematic views of the PCM structure of FIG. 1 according to various additional embodiments of the present disclosure.

Specifically, as shown in FIG. 7A, the PCM structure 610 is illustrated according to such embodiments. Components that are similar to the embodiments of FIG. 1 are indicated with corresponding reference numerals increased by 600.

As shown in FIG. 7A, the PCM structure 610 can be incorporated in an elongate fiber 611 having a core 631 (e.g., $SiO_2$ core) that is encased by a cladding layer 633. The core 631 and cladding layer 633 can define an opening 635 in which the PCM structure 610 can be disposed. An outer surface 639 of the PCM structure 610 can be exposed within the opening 635. The outer surface 639 can be an outer surface of the polymeric structure or the outer surface of the metallic structure. In some embodiments, water or other surrounding media can be received in the opening 635, on the surface 639 of the PCM structure 610. The PCM structure 610 can thus be used as discussed herein. Accordingly, the fiber 611 can be a compact, efficient construction including the PCM structure 610.

Figure 7B:
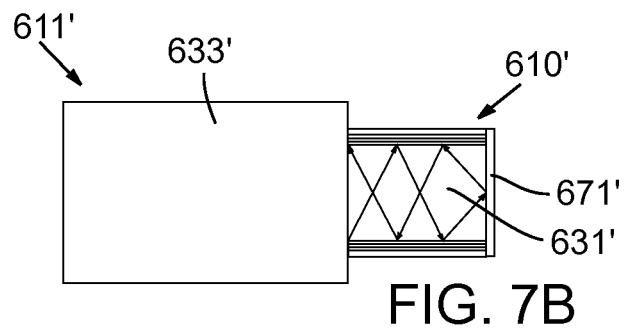

Also, as shown in FIG. 7B, the PCM structure 610' can also be incorporated in a fiber 611', adjacent the terminal end of the fiber. More specifically, the PCM structure 610' can be deposited over the outer radial surface of core 631' of the fiber 611'. The cladding 633' can leave the terminal end of the fiber 611' and the PCM structure 610' exposed. A reflecting member 671' (e.g., a metal coating or other reflective material) can be included at the longitudinal terminal end of the fiber 611' as well, adjacent the PCM structure 610'. Thus, light can be transmitted through the core 631' and can reflect off of the reflecting member 671' toward the PCM structure 610'. Accordingly, this configuration can provide significant flexibility for use.

Figure 7C:
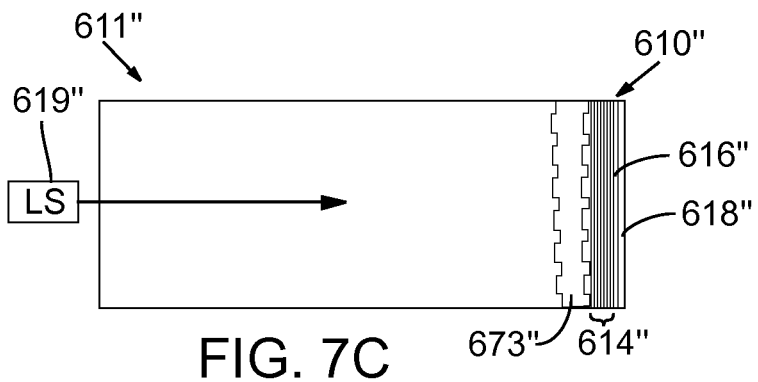

Moreover, as shown in FIG. 7C, the PCM structure 610" can be included at the terminal end of the fiber structure 611". The PCM structure 610" can be aligned such that the different layers of the PC structure 614", the defect member 616", and the metallic structure 618" extend transverse (e.g., perpendicular to the axis of the fiber structure 611". The fiber structure 611" can further include a grating member 673". Light from the light source 619" can be transmitted along the longitudinal axis of the fiber structure 611" and through the grating member 673". The grating member 673", in turn, can diffract light to excite surface plasmons in the PCM structure 610". Accordingly, ultrasound can be generated and/or detected, or the fiber structure 611" can be used for any other suitable purpose.

Figure 7D:
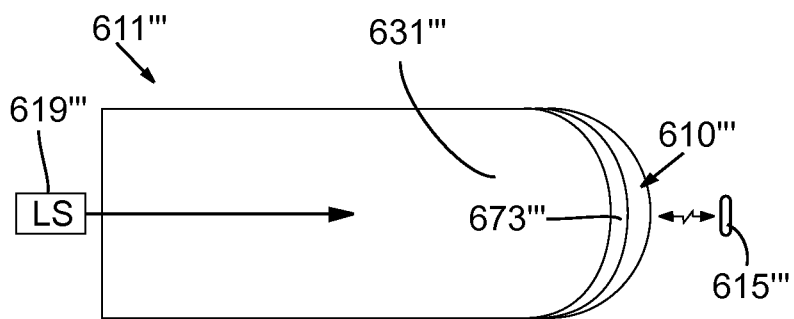

Still further, as shown in FIG. 7D, the PCM structure 610''' can be incorporated at the terminal end of the fiber structure 611''', similar to FIG. 7C. However, the terminal end of the core 631''' of the fiber structure 611''' can have curvature (convex or concave curvature) to operate as a focused lens, and the grating 673''' and the PCM structure 610''' have similar curvature. Thus, where the PCM structure 610''' is operated as an ultrasound transducer, the focused lens-type structure can focus the generated ultrasound to the object 615''', and the focused lens can also collect and focus the reflected ultrasound back to the fiber structure 610'''.

It will also be appreciated that the PCM structures discussed herein can also be used in ultrasound imaging, acoustic microscopy and any other possible areas. The PCM structure can further be used in broad-band, all-optical ultrasound transducer arrays for high resolution, 3-D ultrasound imaging, for medical imaging, for biomedical research, and/or for a wide variety of industrial applications.

The PCM structure of the embodiments discussed above can also be implemented as a biosensor device (e.g., for detecting affinity of biological materials, detecting adsorbed materials that are adjacent the metallic structure, and/or for detecting biological characteristics of ambient medium). It will be appreciated that the PCM structure can provide a narrower resonance dip, more controllable operative wavelength and angle, longer propagation length, flexible sensing surfaces, etc. as compared to conventional biosensors. In addition, with narrower resonance mode, the PCM structure can achieve higher detection sensitivity with intensity modulation.

The study of biomolecular binding affinity and kinetics, such as protein-protein binding, the binding of small molecules and drugs to biological targets, or evaluations of DNA hybridization, provides insights into fundamental biological processes and serves as the basis for diagnostic and drug discovery applications. Sensitive, accurate and high throughput analytical instruments that can provide insights into these critical biological processes, is highly demanding. Although fluorescence-based optical detection currently has been the dominant technology for biomolecular detection with extremely high sensitivity, it requires labeling of target molecules that may alter or inhibit the functionality of the small molecule under study. In contrast, label-free based detection measures analytes in their natural form, allowing for accurate, quantitative and kinetic measurement of molecular interactions. Label-free optical sensing platforms based on surface plasmon resonance (SPR), interferometry, optical waveguides, optical ring resonators and photonic crystals, as well as many others, have been investigated.

The most widely used commercial system for label-free binding analysis is the SPR-based biosensor. It detects the binding of analytes to ligands immobilized on a continuous metal surface in a total-internal-reflection geometry. The excited surface plasmon modes by p polarization light are very sensitive to the influence of bound molecules on the refractive index of the dielectric medium adjacent to the metal film, with a sensitivity exceeding $10^3$ nm per refractive index unit (RIU). However, owing to large absorption in the metal film, the SPR resonance mode is broad (a few tens of nm). It restricts its detection sensitivity and precludes its use for applications that require detection of small molecules (<1, 000 Da) or low surface coverage (smaller than 1 pg/mm$^2$) of bound molecules. In addition, the propagation length along the metal surface is normally short (e.g. ~3 μm for 633 nm, ~15 μm for 805 nm), which limits the detected area and lower down detection sensitivity.

One key to obtaining higher sensitivity is to narrow the optical resonance below that exhibited by classical surface plasmon resonances. As shown above, the plasmon mode of our PC-Metallic structure has to satisfy both the existence of resonance mode in the Fabry-Perot cavity and the surface plasmon mode in the metallic structure, therefore, its width can be much narrower than that of SPR-based sensor.

In some embodiments, to obtain a pronounced dip around the operative wavelength of 632.8 nm and the incident angle of approximately 64° in the substrate, the PC-Metallic structure is built as follows: substrate (BK7 glass)/TiO2/(SiO2/TiO2)$^5$/X(SiO2)/Au (like FIG. 4 shows), and their thicknesses are determined to be 90 nm, 340 nm, 340 nm, 9 nm for TiO2, SiO2, X and Au layers respectively, using transfer matrix calculation. In some embodiments, the PCM structure can exhibit at least an order of magnitude narrower resonance dip width (Δλ or Δθ) than a comparable SPR sensor. However, its bulk solvent index sensitivity (S) may be slightly lower than an SPR sensor. Typically, the resonance mode shift can be resolved with a precision 1% of the line width, determining from a parabolic minimum fit to the Lorentzian curve. Then the estimated detection limit for bulk solvent index by angle or wavelength modulation can be expressed as:

$$DL = \frac{\delta\lambda}{S} \approx \frac{1\% \cdot \Delta\lambda}{S}$$

The detection limit of the PC-Metallic sensor can be approximately 10 times lower than that of SPR sensors. The ultimate detection limit can be further lowered down with other methods (double reference, fitting, high resolution CCD detection). Moreover, for the same operative wavelength 632.8 nm, the incident angle can be 64.04° for the PC-Metallic sensor, smaller than that of an SPR sensor (72.14°), which makes the PCM sensor easier to operate in experiments. In addition, we compare the plasmon propagation length LSP along the metal sensing surface, which can be approximately determined from the resonance width Δθ of the resonance curve:

$$L_{SP} \approx \left(\frac{2\pi}{\lambda} n_s \cos\theta_{res} \Delta\theta\right)^{-1}$$

The propagation length for the PC-metallic sensor can be over 30 times longer than an SPR sensor. Accordingly, the detection area can be greatly increased.

The PC-Metallic sensor can also be used to monitor the resonance mode shift due to biomolecular binding. For conventional SPR-based biosensor with a broad resonance, the most common approaches used in high-performance systems are based on angular or wavelength modulation, which could reach SPR's theoretical detection limit $10^{-7}$ RIU. However, the sensitivity of these modulations is limited, as the bottom of the dip is usually flattened. For a narrower resonance, much higher sensitivity can be obtained by performing an intensity measurement with a single-wavelength laser probe tuned to the middle of the fall-off of the resonance. Because of the relative large slope of the fall-off, a minor shift of the resonance mode due to the analyte binding on the sensing surface can be transformed into a detectable change in light intensity. Moreover, a reference channel can be used to suppress the fluctuations of laser intensity and temperature, etc. The PC-Metallic sensor with a moderate narrow resonance (~5 nm) and a tunable working wavelength can also greatly benefit from the intensity modulation and achieve the highest possible detection sensitivity (theoretical detection limit $10^{-8}$ RIU), which is one order of magnitude higher than SPR's theoretical detection limit.

For SPR sensors, the adjustment of the operative wavelength, incident angle, and resonance dip width, can be difficult due to the limited variable parameters (mainly the thickness of the metal layer). In sharp comparison, the PC-Metallic sensor of the present disclosure can fully take advantage of the properties of the photonic crystal structure, and have several variable parameters (the number of dielectric layers, the defect layer thickness, the metal layer thickness) to adjust to get the pronounced resonance dip in the reflectance spectrum. For example, the resonance dip width can be reduced by increasing the number of PC layers and decreasing the metal layer thickness. One or more additional dielectric layers (e.g., 633 nm SiO2) on top of the metal layer can be added as well, since the structure can form another Fabry-Perot resonant microcavity. This provides several advantages: 1) get a narrower resonance mode, which is impossible for SPR sensors; 2) still get large field intensity on the sensing surface; 3) can protect the metal layer; 4) can use either developed surface chemistry on metal layer, or common surface chemistry on glass slides, or other suitable surfaces for biomedical applications.

The PC-Metallic sensor could also include metallic nanostructure instead of metal film. On one hand, this can greatly increase the sensing area and thus detection sensitivity for biomolecular detection. On the other hand, the metallic nanostructure can provide access to a size selectivity option for biomolecular analytes. The PC-Metallic sensor could also be configured for retrofitting commercially available SPR-based sensors, such as those available from Biacore Life Sciences of Sweden. The PC-Metallic sensor chip can be used to replace the conventional SPR sensor chip to achieve more than one order of magnitude higher sensitivity and to provide flexible sensing surfaces for biomedical applications. In addition, the PC-Metallic biosensor also can be operated in optical waveguides or fibers as discussed above.

The PCM structure can also be used for enhanced fluorescence and Raman scattering detection. The PCM structure can attain large intensity enhancement for light of a specific wavelength. The PC-Metallic structure can provide a powerful and unique substrate (instead of glass or a purely metallic surface) for many applications that need metallic structure. Thus, the PCM structure can be used in total internal reflection fluorescence microscopy (TIRFM) and Surface-Enhanced Raman spectroscopy (SERS), although the applications of the PCM structure are not necessarily limited to TIRFM and SERS.

Total internal reflection fluorescence microscopy (TIRFM) is a powerful technique. It can excite and visualize fluorophores present in extremely thin axial sectioning (like the near-membrane region of live or fixed cells grown on coverslips), which allows wide-field imaging with very low background and minimal out-of-focus fluorescence. The unique features of TIRFM make it invaluable in biological studies, such as single molecule detection, single particle tracking and the observation of dynamic membrane events on live cell surfaces (signaling, endocytosis, and exocytosis).

The principle behind TIRFM is the phenomenon of total internal reflection. When excitation light reaches the interface of a medium of higher refractive index and a medium of lower refractive index at an angle of incidence greater than a specific critical angle, total internal reflection occurs and all light is reflected toward the high index medium. However, the reflected light will generate an electromagnetic field that penetrates beyond the interface as an evanescent wave, into the medium of lower refractive index. This standing wave decreases exponentially with distance into the medium and penetrates only a very short distance (~100 nm) beyond the interface. It can be used to excite fluorescence in objects within the evanescent field. Unwanted background and out-of-focus fluorescence signals are dramatically reduced with TIRFM, thus improving the sensitivity of the system and the ability to view very dim fluorescence events.

The penetration length d is an important parameter in TIRFM that determines the detected area, and can be expressed as:

$$d = \frac{\lambda}{4\pi\sqrt{n_S^2 \sin^2\theta_S - n_t^2}}$$

where $\lambda$ is the wavelength of the incident light, $n_s$, $n_t$ are the refractive indices of the high-index substrate (like a glass slide) and the low-index medium (like water or an analyte solution), and $\theta_s$ is the incident angle in the substrate. Therefore, in order to obtain a short penetration length and improve the signal-to-noise ratio of TIRFM, it is better to use a shorter wavelength, larger incident angle, or higher index substrate.

The sensitivity of TIRFM is directly related to the excitation intensity, which is maximal at the interface and decreases exponentially with increasing distance from the interface. However, the intensity enhancement for the excitation light within the evanescent field (using pure glass as the substrate) is small, which disfavors fluorescence emission. The information gained from TIRFM will thus be limited by the relative intensities of the fluorescence signal and the background noise (emanating from the inner part of the cell).

If the excitation light intensity can be increased by field enhancement in the evanescent region, then the fluorescence emission in TIRFM will be enhanced. However, background noise should remain low as well.

Figure 8:
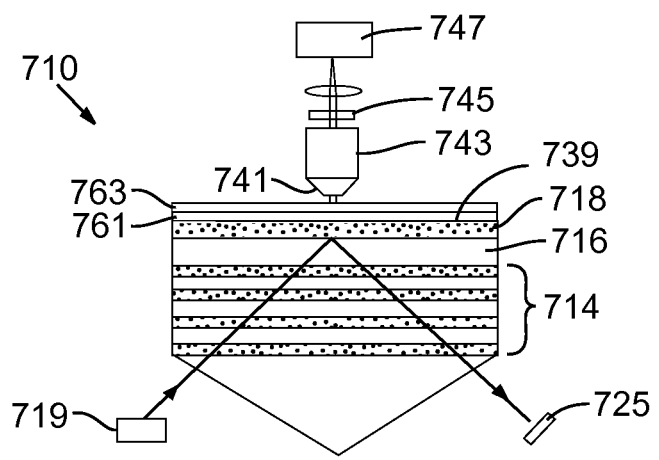
FIG. 8 is a schematic sectional view of the PCM structure of FIG. 1 for a prism-type total-internal-reflection microscopy according to additional embodiments of the present disclosure.

The PC-Metallic structure combines the properties of a photonic crystal structure with that of a metallic structure and provides many unique advantages in TIRFM. Referring now to FIG. 8, the PCM structure 710 is illustrated according these additional embodiments. Components that are similar to the embodiments of FIG. 1 are indicated with corresponding reference numerals increased by 700.

As shown, the PCM structure 710 can include an aqueous sample 761 containing a fluorescent object on the metallic structure 718, on the side opposite the PC structure 714 and defect layer 716. A coverslip 763 can additionally be included over the aqueous sample 761. An objective lens 743, filter 745, and CCD camera 747 can be arranged over the PCM structure 710 as shown. The PCM structure 710 can enhance fluorescence significantly, and can reduce background noise significantly, and the optics 743, 745, 747 can be used to detect the fluorescence more accurately. Compared to conventional total-internal-reflection fluorescence microscopy (TIRFM), the incident angle can be adjusted to the resonance angle of the PCM structure 710 with the light detector 725, which can be used to estimate the penetration length of the evanescent field.

Specifically, the PC-Metallic structure 710 can greatly improve the fluorescence signal. For instance, the signal can reach approximately 10-fold intensity enhancement over a pure metal structure, and 40- to 50-fold enhancement over glass.

Also, the PC-Metallic structure 710 can also exhibit relatively low background noise. The presence of the metallic structure 718 acts as a strong distance-dependent filter, effectively selecting fluorophores at the correct distance for a live membrane observation. At very short distances (<10 nm), fluorescence can be quenched, which reduces noise from fluorescent molecules adhering to the coverglass surface. At larger distances (>150 nm), most of the emitted fluorescence (>90%) can be reflected by the metal and the detection efficiency can be low, which is useful in reducing background fluorescent noise from the inner part of the cell. Also, at intermediate distances (10-50 nm), the detection efficiency can be high, which can be ideal for detecting fluorescence in the membrane of cells.

Moreover, the PC-Metallic structure 710 can be only sensitive to p-polarization, which enables better suppression of background noise. The fluorescence coupling to surface plasmons can depend dramatically on the orientation of the molecule transition moment: coupling can be very efficient for the orthogonal dipole orientation (p-polarization); conversely, coupling can be much weaker for a dipole orientation in the plane of metal surface (s-polarization). This feature makes the PC-Metallic structure 710 useful for measurements of orientation changes.

Additionally, the PC-Metallic structure 710 can be designed to operate at different incident angles. For PC-Metallic based TIRFM, the PC structure 714 can be configured for various incident angles. Thus, the PC-Metallic structure 710 can be very convenient to use in TIRFM.

Still further, the PC-Metallic structure 710 can accurately control the resonance angle for incidence and the penetration length. The detection of TIRFM is largely dependent on the penetration length, which is often unknown. The detector 725 can be used to monitor the reflected intensity. When the incident angle is the resonance angle of the PC-Metallic structure 710, the reflected intensity can reach a minimum. Since the structure can have a very small resonance width (e.g., 0.12°), the incident angle can be accurately prescribed, and so can the penetration length.

In summary, our PC-Metallic structure 710 can enhance the fluorescence signal by more than one order of magnitude above that of conventional TIRFM, and reduce the background noise dramatically, which improves the detection sensitivity and resolution of TIRFM. In addition, the PC-Metallic structure can be operated at smaller incident angles and the penetration length be accurately determined. These features make the PC-Metallic structure 710 useful for TIRFM applications.

The performance of PC-Metallic structure-based TIRFM can be further improved by nanostructuring the metallic structure 718. Although the PC-Metallic structure 710 leads to a shorter propagation length along the metal structure 718 (~10-80 μm) than that a PC-based structure (~200 μm), it may still increase the detected area in TIRFM at a certain degree. Using a metallic (e.g., gold) nanostructure (e.g., one that is made less than 50 nm deep), the plasmon modes can be localized in a very small area, further reducing the detection volume to reach a high signal-to-noise (SNR) ratio.

Thus, the PCM structure 810 is illustrated according to these additional embodiments. Components that are similar to the embodiments of FIG. 1 are indicated with corresponding reference numerals increased by 800.

As shown, the defect layer 816 can include a metal nano-structured layer, and the metallic structure 818 can also include a nanostructured layer. The nanostructured layer 818 can include a plurality of localized structures (e.g., particles) of metal (e.g., gold) that are included on separate columns defined by the nanostructure. Specifically, the nanostructured metallic layer 818 can include a bottom structure 892 (first structure) and a top structure 894 (second structures). The bottom structures 892 can be spaced at a first distance, dx, away from the PC structure 814, and the top structures 894 can be spaced at a second distance, dx+dr, away from the PC structure 814. The bottom structure 892 can satisfy the resonance condition and can get large enhancement. The top structure 894 can be off resonance and can get much smaller enhancement. Thus, the metal in the metallic structure 818 can be localized, for instance, to improve the signal-to-noise ratio of fluorescence detection.

Figure 9A:
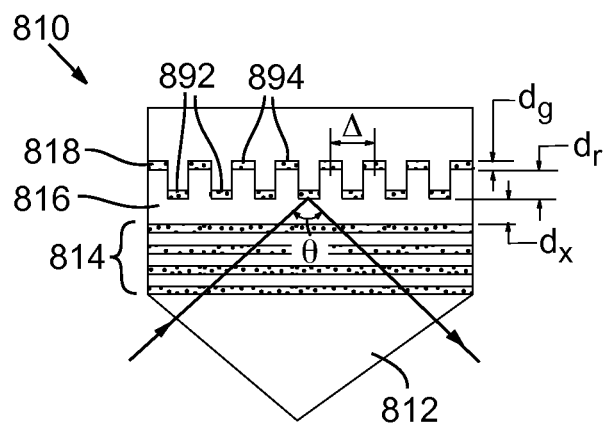
FIGS. 9A-9C are schematic views of the PCM structure of FIG. 1 according to various additional embodiments of the present disclosure.
Figure 9B:
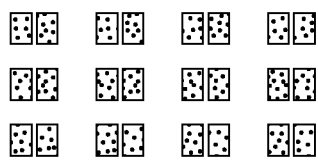
Figure 9C:
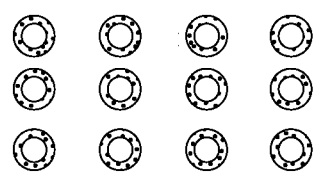

As shown in FIGS. 9B-9C, different types or shapes of metal materials can be used as the metallic structure 818. In FIG. 9B, the metallic structure 818 can include rectangular antenna that are arranged in pairs. In FIG. 9C, the metallic structure 818 can be ring-shaped. There can be additional shapes and arrangements for the metallic structures 818 to greatly localize intensity enhancement and improve the signal-to-noise ratio.

Besides the advantages provided by a zero-mode waveguide, such as a reduction in detection volume and increase in signal-to-noise, the PC-Metallic nanostructure 810 can further improve the signal-to-noise ratio. The structure is designed to reach high on-resonance intensity with the gold layer and off-resonance for the region without gold at a certain angle. Also, the intensity enhancement with light incidenting on the gold region is predicted to be much (~200-fold) higher than that on the region without gold.

Another advantage that this PC-Metallic nanostructure 810 may provide is to achieve subdiffraction resolution. The nanostructure surface can be used to modify the wave front of the incident beam to build constructive interference patterns from scattered evanescent waves on the nanostructure surface, which in turn could theoretically reach a detection resolution of one-sixth of the wavelength used.

PC-Metallic for Simultaneous Enhancement or Multi-Color Measurement

The PCM structure can further be used to simultaneously enhance excitation and emission fluorescence intensity, or to enable multi-color measurements. For example, the PC-Metallic structure can be designed as: substrate (BK7 glass)/TiO2/(SiO2/TiO2)5/X(SiO2)/Au, with thicknesses of 90 nm, 340 nm, 9 nm for the TiO2, SiO2 and Au layers, respectively. Since a Fabry-Pérot microcavity forms in the defect layer, its thickness can be configured to obtain multiple resonance modes and control the distances between them for different applications. For instance, the defect layer thickness can be 20 μm and the incident angle can be 64.1°. A large intensity enhancement (~250-fold for excitation and 320-fold for emission) can be achieved for two different resonance wavelengths to improve the fluorescence excitation and emission intensities simultaneously.

Obviously, a PC-Metallic structure providing multiple resonance wavelengths can also be used to improve the performance of multi-color measurements, where different wavelengths lasers or a supercontinuum white light source are employed to excite multiple fluorescence signals at the same time.

Figure 10:
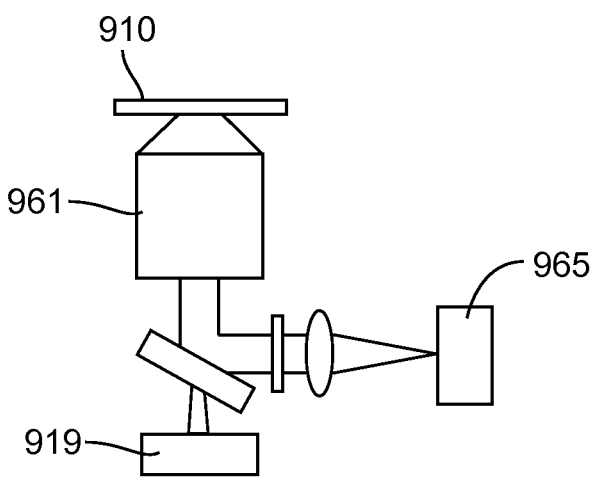
FIG. 10 is a schematic view of a PCM structure of FIG. 1 for an object-type total-internal-reflection microscopy according to various additional embodiments of the present disclosure.

Moreover, the PC-Metallic structure can be also used in objective-type TIRFM. As shown in FIG. 10, the PCM structure 910 is illustrated according to such embodiments. Components that are similar to the embodiments of FIG. 1 are indicated with corresponding reference numerals increased by 900.

As shown, the PCM structure 910 can be used in objective-type fluorescence microscopy. As shown, the PCM structure 910 can be disposed over an objective lens 961, and a light source 919 (e.g., laser) can input light into the objective lens 961. The intensity of the light is enhanced by the PCM structure 910 at a resonance angle, which is used to excite a large fluorescence signal. This emitted fluorescence signal is collected back through the objective lens 961 to a camera 965. Thus, the PCM structure 910 can be implemented for highly-sensitive, real-time cell imaging or other similar uses.

The PC-Metallic structure 910 could be used in both prism-type and objective-type TIRFM, and can greatly improve the performance of TIRF imaging, including an enhanced fluorescence signal, low background noise, and subdiffraction limit resolution. Moreover, for prism-type TIRFM, it can be easily integrated with the biosensing measurements described above to provide more information about biomolecular interactions.

In still other embodiments, the PCM structure can be used for Raman spectroscopy (SERS). Surface-enhanced Raman spectroscopy (SERS) is a very attractive spectroscopic method because the Raman signal, unlike fluorescence, contains detailed information derived from molecular structure that is very useful in chemical identification. The PCM structure can enhance surface plasmon field intensity, and the Raman signal can be directly related to the optical intensity close to the molecules. PCM structures, such as the structure 810 shown in FIG. 8 can be used for SERS; however, variations can be made in the structure 810 without departing from the scope of the present disclosure.

When a laser light is incident on the metal structure, surface plasmons are excited at resonance frequency. Then, the plasmon waves are scattered by molecules and generate the Raman signal. The Raman scattered light transfers back to plasmons and scatters in the surrounding media (e.g., air, water, etc.). The plasmons at the metal structure assist in coupling light into molecules close to the surface and couple out photons into specific directions. It is this enhanced coupling both into and out of the molecule that enhances the Raman signal. Therefore a strong plasmon field will be attractive for SERS.

Moreover, the PCM structure can be used as label-free biosensor, thereby enabling another unique application: combination of both SERS detection and label-free detection at the same time to provide comprehensive investigations on biomolecular interaction (e.g., biomolecular binding detection and complete biomolecular identification).

Thus, the PCM structures disclosed herein can be used as a plasmon excitation mechanism using photonic crystal structure and metallic structure in a total-internal-reflection geometry. This unique configuration, possessing the advantages of photonic crystal and metallic structure, has been explored to develop novel broad-band, all-optical ultrasound transducers for high resolution ultrasound imaging, highly-sensitive biomolecular sensor, and enhanced total-internal-reflection fluorescence microscopy and surface-enhanced-Raman spectroscopy. Moreover, multiple capabilities also make the PC-metallic structure useful to develop integrated systems, like combination of biosensing and TIRF measurement, or biosensing and SERS, to provide more information for biomolecular interactions. In addition, our PC-Metallic structure can be integrated on optical fibers or waveguides, which provides other advantages and allows broader applications.

It will be appreciated that the PC structure of the PCM structure can be designed with different materials to satisfy different applications, like SiO2/TiO2 for visible range, GaAs/AlAs for near-infrared range, etc. Also, the metallic structure is also not limited to metal film, and can be metallic nanostructure, metallic nanoparticles (nanorod), metamaterials (negative refractive index material), graphene, etc.

The foregoing description of the embodiments has been provided for purposes of illustration and description. It is not intended to be exhaustive or to limit the scope of the present disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the present disclosure, and all such modifications are intended to be included within the scope of the present disclosure.

We claim:

1. A photonic crystal-metallic structure that receives an input light signal from a light source comprising: a metal structure; a defect member; and a photonic crystal structure disposed adjacent the metal structure such that the defect member is disposed between the metal structure and the photonic crystal structure, the photonic crystal structure configured to receive the input light signal such that the input light signal excites surface plasmons of the metal structure and such that the input light signal is internally reflected within the photonic crystal structure at a total internal reflection (TIR) boundary defined at an interface between the defect member and the metal structure.

2. The photonic crystal-metallic structure of claim 1, wherein the metal structure is a substantially continuous metal layer that is disposed directly on the defect member.

3. The photonic crystal-metallic structure of claim 1, further comprising a polymeric layer that is disposed on the defect member, and wherein the metal structure includes a plurality of metal particles that are embedded within the polymeric layer.

4. The photonic crystal-metallic structure of claim 1, wherein the metal structure extends along a first, straight transverse direction, and wherein the metal structure includes a plurality of metal nanostructures that are separated at a distance apart from each other along the transverse direction.

5. The photonic crystal-metallic structure of claim 1, wherein the metal structure includes a plurality of first structures and a plurality of second structures, the plurality of first structures being spaced apart at a first distance from the photonic crystal structure, the plurality of second structures being spaced apart at a second distance from the photonic crystal structure.

6. The photonic crystal-metallic structure of claim 1, further comprising an outer member that is disposed adjacent the metal structure such that the metal structure is disposed between the photonic crystal structure and the outer member, the outer member configured to expand due to increasing temperature, the photonic crystal structure configured to receive the input light signal to generate heat that is received by the outer member to thermally expand the outer member to generate an optoacoustic wave that is transferred away from the outer member.

7. The photonic crystal-metallic structure of claim 1, further comprising an outer member that is disposed adjacent the metal structure such that the metal structure is disposed between the photonic crystal structure and the outer member, the outer member configured to elastically flex due to receipt of an ultrasonic signal, and further comprising a light detector that detects an output light signal to thereby detect flexure of the outer member due to the ultrasonic signal.

8. The photonic crystal-metallic structure of claim 1, wherein the light source is a first light source, further comprising a second light source, further comprising an outer member that is disposed adjacent the metal structure such that the metal structure is disposed between the photonic crystal structure and the outer member, further comprising a light detector, the first light source inputting a first input light signal to the photonic crystal structure to generate heat that is received by the outer member to generate an acoustic wave that is transferred away from the outer member to be reflected from an object back toward the outer member, the second light source inputting a second input light signal to the photonic crystal structure that is internally reflected to output a second output light signal that is detected by the light detector to thereby detect influence of the reflected acoustic wave on the outer member.

9. The photonic crystal-metallic structure of claim 1, wherein at least one of an adsorbed material or an ambient medium can be disposed adjacent the metal structure, and further comprising a light detector that detects an output light signal to detect a characteristic of the at least one of the adsorbed material or the ambient medium.

10. The photonic crystal-metallic structure of claim 1, wherein the metal structure and the photonic crystal structure are included in a fiber structure.

11. The photonic crystal-metallic structure of claim 1, further comprising an objective lens, a light detector, the photonic crystal structure configured to receive the input light signal such that the input light signal is received by a fluorescent object disposed adjacent the metal structure such that the fluorescent object emits a fluorescence that is collected by the objective lens.

12. The photonic crystal-metallic structure of claim 10, wherein the fiber structure includes an opening that exposes a surface, the surface being adjacent the metal structure on a side opposite the photonic crystal structure, an ambient medium being disposed adjacent the surface.

13. The photonic crystal-metallic structure of claim 10, wherein the fiber structure includes a terminal end, wherein the metal structure and the photonic crystal structure are disposed adjacent the terminal end of the fiber structure, and further comprising a reflecting member that is disposed adjacent the terminal end of the fiber structure, the reflecting member operable to reflect the input light signal toward the photonic crystal structure.

14. The photonic crystal-metallic structure of claim 10, wherein the fiber structure further includes a light-transmissive core and a grating, the grating being disposed between the light-transmissive core and the photonic crystal structure, the grating diffracting light from the core to the photonic crystal structure and the metal structure.

15. The photonic crystal-metallic structure of claim 10, wherein the photonic crystal-metallic structure includes a terminal end, the photonic crystal structure and the metal structure being disposed adjacent the terminal end, the terminal end having curvature to operate as a focused lens.

16. The photonic crystal-metallic structure of claim 11, wherein the input light signal is input through the objective lens to the photonic crystal, the fluorescence collected by the objective lens to be detected by the light detector.

17. A method of operating a photonic crystal-metallic structure comprising: providing a metal structure adjacent a photonic crystal structure and a defect member between the metal structure and the photonic crystal structure; and emitting an input light signal from a light source to the photonic crystal structure such that the input light signal excites surface plasmons of the metallic structure and such that the input light signal is internally reflected within the photonic crystal structure at a total internal reflection (TIR) boundary defined at an interface between the defect member and the metal structure.

18. The method of claim 17, further comprising providing an outer member such that the metal structure is disposed between the outer member and the photonic crystal structure, and further comprising generating heat when the input light signal is input from the light source, the heat absorbed by the outer member, which thermally expands to generate an optoacoustic wave that is transferred away from the outer member.

19. The method of claim 17, further comprising providing an outer member that is elastic and that is disposed adjacent the metal structure such that the metal structure is disposed between the photonic crystal structure and the outer member, and further comprising detecting an output light signal to thereby detect flexure of the outer member due to influence of an ultrasonic signal on the outer member.

20. The method of claim 17, further comprising providing an outer member such that the metal structure is disposed between the outer member and the photonic crystal structure, wherein the light source is a first light source, further comprising providing a second light source, further comprising inputting a first input light signal from the first light source to the photonic crystal structure to generate heat that is received by the outer member to generate an acoustic wave that is transferred away from the outer member to be reflected from an object back toward the outer member, further comprising inputting a second input light signal from the second light source to the photonic crystal structure that is internally reflected to output a second output light signal, and further comprising detecting the second output light signal to thereby detect influence of the reflected acoustic wave on the outer member.

21. The method of claim 17, further comprising detecting an output light signal to detect a characteristic of at least one of an adsorbed material or an ambient medium adjacent the metal structure on a side opposite the photonic crystal structure.

22. The method of claim 17, further comprising providing an objective lens and a light detector, wherein emitting the input light signal includes emitting the input light signal such that the input light signal is received by a fluorescent object that is adjacent the metal structure on a side opposite the photonic crystal structure, the fluorescent object emitting a fluorescence that is collected by the objective lens.

23. A photonic crystal-metallic structure that receives an input light signal from a light source comprising: a metal structure; a defect member; a photonic crystal structure disposed adjacent the metal structure such that the defect member is disposed between the metal structure and the photonic crystal structure, the photonic crystal structure configured to receive the input light signal such that the input light signal excites surface plasmons of the metallic structure and such that the input light signal is internally reflected within the photonic crystal structure at a total internal reflection (TIR) boundary defined at an interface between the defect member and the metal structure to thereby operate as one of an ultrasonic generator, an ultrasonic sensor, an ultrasonic transducer, a biosensor, and a fluorescence detector.

* * * * *